(12) United States Patent
Aetukuri et al.

(10) Patent No.: US 10,770,769 B2
(45) Date of Patent: Sep. 8, 2020

(54) ION CONDUCTING HYBRID MEMBRANES

(71) Applicants: International Business Machines Corporation, Armonk, NY (US); ASAHI KASEI KABUSHIKI KAISHA, Osaka (JP)

(72) Inventors: Naga Phani B. Aetukuri, San Jose, CA (US); Mark W. Hart, San Jose, CA (US); Ho-Cheol Kim, San Jose, CA (US); Shintaro Kitajima, Osaka (JP); Leslie E. Krupp, Isleton, CA (US); Bryan D. McCloskey, Campbell, CA (US); Robert D. Miller, San Jose, CA (US); John Campbell Scott, Los Gatos, CA (US); Winfried Wilcke, Los Altos Hills, CA (US)

(73) Assignees: International Business Machines Corporation, Armonk, NY (US); Asahi Kasei Kabushiki Kaisha, Osaka (JP)

( * ) Notice: Subject to any disclaimer, the term of this patent is extended or adjusted under 35 U.S.C. 154(b) by 87 days.

(21) Appl. No.: 16/209,894

(22) Filed: Dec. 4, 2018

(65) Prior Publication Data

US 2019/0109359 A1    Apr. 11, 2019

Related U.S. Application Data

(60) Continuation of application No. 15/148,676, filed on May 6, 2016, now Pat. No. 10,170,813, which is a
(Continued)

(51) Int. Cl.
*H01M 4/02* (2006.01)
*H01M 12/08* (2006.01)
(Continued)

(52) U.S. Cl.
CPC ............... *H01M 12/08* (2013.01); *C08J 5/22* (2013.01); *H01M 8/1048* (2013.01);
(Continued)

(58) Field of Classification Search
CPC ........................................................ H01M 4/02
See application file for complete search history.

(56) References Cited

U.S. PATENT DOCUMENTS 4,183,988 A * 1/1980 Farrington .............. H01M 2/14
                                                   252/519.33
4,636,314 A   1/1987 Beuhler et al.
(Continued)

FOREIGN PATENT DOCUMENTS

CN    1726608 A    1/2006
CN    1894821 A    1/2007
(Continued)

OTHER PUBLICATIONS

Capsoni, "Recent advances in the development of Li-air batteries," Journal of Power Sources, available online Aug. 21, 2012, pp. 253-263.
(Continued)

*Primary Examiner* — Jacob B Marks
(74) *Attorney, Agent, or Firm* — H. Sanders Gwin, Jr.; Shumaker & Sieffert, P.A.

(57) ABSTRACT

A method includes dispensing ion-conducting particles on a substrate comprising an adhesive to which the ion-conducting particles adhere; overcoating the ion conducting particles with a polymer; removing the substrate and the adhesive from the ion conducting particles; and removing a polymer overburden on the ion conducting particles to form a device that includes: (i) the polymer or a derivative
(Continued)

thereof, and (ii) ion-conducting particles. At least a portion of the ion-conducting particles extend through the polymer or its derivative.

18 Claims, 15 Drawing Sheets

Related U.S. Application Data division of application No. 14/199,394, filed on Mar. 6, 2014, now Pat. No. 9,520,627.

(51) Int. Cl.
| | | |
|---|---|---|
| C08J 5/22 | (2006.01) | |
| H01M 8/1048 | (2016.01) | |
| H01M 8/1069 | (2016.01) | |
| H01M 10/056 | (2010.01) | |
| H01M 12/02 | (2006.01) | |

(52) U.S. Cl.
CPC ....... *H01M 8/1076* (2013.01); *H01M 10/056* (2013.01); *H01M 12/02* (2013.01); *H01M 2300/0065* (2013.01); *H01M 2300/0082* (2013.01); *Y02E 60/128* (2013.01)

(56) References Cited

U.S. PATENT DOCUMENTS

| | | | |
|---|---|---|---|
| 4,654,104 | A | 3/1987 | Mcintyre et al. |
| 4,752,370 | A | 6/1988 | McMichael et al. |
| 7,303,833 | B2 | 12/2007 | Cortright et al. |
| 7,662,517 | B2 | 2/2010 | Lee et al. |
| 7,824,806 | B2 | 11/2010 | Visco et al. |
| 7,943,269 | B2 | 5/2011 | Yates et al. |
| 8,173,325 | B2 | 5/2012 | Takagi et al. |
| 8,309,265 | B2 | 11/2012 | Miyauchi et al. |
| 9,502,729 | B2 | 11/2016 | Badding et al. |
| 9,508,976 | B2 | 11/2016 | Herle |
| 9,520,627 | B2 | 12/2016 | Aetukuri et al. |
| 9,601,779 | B2 | 3/2017 | Visco et al. |
| 2004/0191617 | A1 | 9/2004 | Visco et al. |
| 2006/0134488 | A1 | 6/2006 | Cortright et al. |
| 2007/0051620 | A1 | 3/2007 | Visco et al. |
| 2007/0072036 | A1 | 3/2007 | Berta et al. |
| 2008/0182157 | A1 | 7/2008 | Visco et al. |
| 2010/0068593 | A1 | 3/2010 | Reiche et al. |
| 2012/0064431 | A1 | 3/2012 | Sato et al. |
| 2012/0082919 | A1 | 4/2012 | Ohuma et al. |
| 2014/0170504 | A1 | 6/2014 | Bake et al. |
| 2015/0056517 | A1 | 2/2015 | Zhou et al. |
| 2015/0188187 | A1 | 7/2015 | Strand et al. |
| 2015/0255767 | A1 | 9/2015 | Aetukuri et al. |
| 2016/0254560 | A1 | 9/2016 | Aetukuri et al. |

FOREIGN PATENT DOCUMENTS

| | | |
|---|---|---|
| CN | 101080840 A | 11/2007 |
| CN | 101088183 A | 12/2007 |
| CN | 101313426 A | 11/2008 |
| CN | 102623756 A | 8/2012 |
| CN | 104995764 A | 10/2015 |
| JP | 2003151361 A | 3/2002 |
| JP | 2008084708 A | 4/2008 |
| JP | 2013069416 A | 4/2013 |
| JP | 2017124951 A | 7/2017 |
| WO | 2007021717 A2 | 2/2007 |
| WO | 2014035753 A1 | 3/2014 |

OTHER PUBLICATIONS

Hammerschmidt et al. "Inkjet Printing of Reinforcing Patterns for the Mechanical Stabilization of Fragile Polymeric Microsieves," American Chemical Society, Jan. 31, 2012, 6 pp.

International Search Report and Written Opinion of International Application No. PCT/IB2015/050706, dated Jun. 11, 2015, 13 pp.

Kiesow et al. "Bicontinuous Zeolite Polymer Composite Membranes Prepared via Float Casting," American Chemical Society, Feb. 12, 2013, 9 pp.

Kumar et al. "Interface-Medicated Electrochemical Effects in Lithium/Polymer-Ceramic Cells," Journal of Power Sources, vol. 195, Jul. 8, 2009, pp. 327-334.

Liao et al., "Crosslinked get polymer electrolytes based on polyethylene glycol methacrylate and ionic liquid for lithium ion battery applications," Electrochimica Acta 87 (2013) p. 889-894. Applicant points out, in accordance with MPEP 609.04(a), that the year of publication, 2013, is sufficiently earlier than the effective U.S. filing date, 2017, so that the particular month of publication is not in issue.

Magerl. et al.. "Porous Polymer Membranes via Selectively Wetted Surfaces." American Chemical Society. Feb. 27, 2012, 11 pp.

Muhlmann et al., "Preparation of Composite Membranes with Bicontinuous Structure," American Chemical Society, Apr. 25, 2012, 8 pp.

Sun, "Lithium ion conducting membranes for lithium-air batteries," Science Direct, Available online Mar. 6, 2013, pp. 801-816.

U.S Appl. No. 15/594,889, filed May 15, 2017 by Nagaphani B. Aetukuri et al.

Yan, et al., "Polymer Membranes with Two-Dimensionally Arranged Pores Derived from Monolayers of Silica Particles," Chem. Mater, American Chemical Society, Jan. 16, 2004, pp. 1622-1626.

List of Patents treated as related, Appendix P, 2 pp.

Prosecution History from U.S. Appl. No. 14/199,394, dated Jan. 20, 2016 through Jun. 23, 2016, 23 pp.

Prosecution History from U.S. Appl. No. 15/148,676, dated Apr. 5, 2018 through Aug. 29, 2018, 22 pp.

\* cited by examiner

ION CONDUCTING HYBRID MEMBRANES

RELATED APPLICATION

This application is Continuation of application Ser. No. 15/148,676, filed May 6, 2016, which is a Divisional of application Ser. No. 14/199,394, filed Mar. 6, 2014, now U.S. Pat. No. 9,520,627, the entire contents of each of which is hereby incorporated by reference.

BACKGROUND

The need for high specific capacities and specific energies has led to the study of various metal-element batteries such as lithium-sulfur, metal-oxygen, lithium-oxygen, and the like. Batteries made with lithium-oxygen, lithium-air and lithium with other gas mixtures containing oxygen are particularly attractive due to the low atomic number and density and high reducing capability of elemental lithium, and a lithium oxygen battery could potentially have a theoretical specific energy three to five times greater than conventional lithium ion batteries.

FIG. 1 is a schematic representation of a lithium oxygen battery 10, in which elemental lithium metal is oxidized at an anode 12 to form lithium ions (Li+) and electrons (e−). The electrons flow about an electric circuit 15 across a load 16 to do electric work, and the lithium ions migrate across an electrolyte 18 to reduce oxygen (from air) at a porous carbon, metal or metal oxide cathode 14. Optional metal catalysts 20 can be incorporated into the cathode 14 to enhance oxygen reduction kinetics and increase the specific capacity of the cathode.

The electrolyte 18 transports lithium ions from the anode 12, and may be selected from solid state lithium ion conducting materials, organic electrolytes, aqueous electrolytes, and combinations thereof. For example, in an organic electrolyte, gaseous oxygen is reduced to form lithium peroxide at the cathode 14, and in aqueous solution reduction of gaseous oxygen to lithium hydroxide occurs at the cathode 14. If an aqueous electrolyte 18 is employed in the battery 10, a lithium ion conducting membrane 22 (LICM) may be used to protect the lithium anode 12 from water, and the membrane 22 may be placed in close contact with the anode 12. If an organic electrolyte 18 is used in the battery 10, the LICM 22 in principle is not required, but may be useful to keep oxygen and any introduced water and $CO_2$ away from the lithium anode 12. In some embodiments the battery 10 may include a multi-electrolyte cell in which the electrolyte solutions in contact with the anode 14 and the cathode 12 are different. In the multi-electrolyte cell, a first electrolyte 18A resides between the cathode 12 and the LICM 22, and a second electrolyte 18B, different from the first electrolyte 18A, resides between the LICM 22 and the cathode 14. This configuration allows the solvents 18A, 18B to be optimized for the electrode with which it is in contact, thus not requiring a single material to deliver both oxidative and reductive resistance.

SUMMARY

In various embodiments, an ion-conducting membrane such as the LICM 22 of FIG. 1 should be processable over large areas, mechanically flexible, impervious to typical organic solvents employed in the electrolyte 18, exhibit good lithium ion ($Li^+$) conductance (preferably greater than $10^{-5}$ S/cm), and provide a barrier to water and reactive gases such as oxygen and $CO_2$.

These are difficult requirements for a single material to satisfy simultaneously. Organic gels are mechanically weak, swell in polar solvents causing dimensional changes, are hygroscopic, do not form good gas barriers, and often have inadequate lithium ion conductivity. Organic polymers, however, can be flexible, tough and provide gas barrier properties depending on the polymer structure, but are usually not ion conducting. Inorganic non-oxide materials can have good ion conductivity, but in some embodiments can be hygroscopic (deliquescent), dissolve in aqueous electrolytes, show questionable glass stabilities, and often react with oxygen. Ceramic glasses also can provide excellent ion conductivity properties, but in some embodiments tend to be brittle and are prone to cracking, and are difficult to utilize for large area membrane applications without going to excessive thicknesses, which can in some cases lead to unacceptable membrane weights and lower ion conductances.

The present disclosure is directed to a hybrid organic/inorganic ion conducting membrane, which in some embodiments can be suitable for large area membrane applications. In various embodiments, the hybrid ion conducting membrane can combine properties of inorganic ion conductive materials (for example, good thermal stability and ion conductivity) with those of organic polymers (processibility, flexibility, fracture and impact toughness, and the like).

In various embodiments, the hybrid ion-conducting membrane includes solid state ion conducting particles embedded in, and spanning the thickness of, a polymeric matrix. In some embodiments, the ion-conducting particles are embedded as a single layer, which can avoid the impedance issues associated with conductance across a particle-particle contact interface.

While any ion conducting inorganic material may be used in the hybrid ion-conducting membrane, in some non-limiting embodiments the hybrid ion conducting membrane can include inorganic particles with good lithium ion conductivity. These membranes can be used as, for example, a LICM in a lithium oxygen battery construction, and in such applications can provide some or all of the following advantages: relative impermeability to water and gases such as oxygen and $CO_2$, resistance to common organic electrolyte solvents; mechanical strength, ease of manufacture, and good lithium ion conductivity.

In one embodiment, the present disclosure is directed to a device, including: a membrane that is: (i) impermeable to oxygen, and (ii) insoluble in at least one polar solvent; and ion conducting particles in the membrane, wherein at least a portion of the particles extend from a first side of the membrane to an opposed second side of the membrane, and wherein the thickness of the membrane is 15 μm to 100 μm.

In another embodiment, the present disclosure is directed to method, including:

dispensing ion-conducting particles on a substrate comprising an adhesive to which the ion-conducting particles adhere;

overcoating the ion conducting particles with a polymer;
removing the substrate and adhesive from the ion conducting particles; and removing a polymer overburden on the ion conducting particles to form a device that includes: (i) the polymer or a derivative thereof, and (ii) ion-conducting particles, wherein at least a portion of the ion-conducting particles extend through the polymer or its derivative.

In yet another embodiment, the present disclosure is directed to a device, including:

a membrane including a polymer selected from cyclo-olefin polymers, poly-para-xylylenes, benzocyclobutenes; olefin addition polymers and copolymers, ring opening metathesis polymers and reduced forms thereof, acyclic diene metathesis polymers and reduced forms thereof, fluorocarbon addition polymers, fluoroether polymers, ring opened cyclobutyl fluoroethers, polyarylenes and polyarylene ethers, polybenzoazoles, polysiloxanes, silsequioxanes, polycarbosilanes, and mixtures and combinations thereof;

metal oxide lithium ion conducting particles in the membrane, wherein at least a portion of the particles have a first exposed surface projecting from a first side of the membrane and a second exposed surface projecting from an opposed second side of the membrane, and wherein the exposed surfaces of the conducting particles are substantially free of the polymer, and wherein the thickness of the membrane is 15 μm to 100 μm.

In yet another embodiment, the present disclosure is directed to a method, including:

(a) dispensing metal oxide lithium ion-conducting particles on an adhesive layer;

(b) overcoating the ion conducting particles with a layer of a polymer selected from cyclo-olefins, poly-para-xylylenes, and benzocyclobutenes;

(c) removing a polymer overburden on the ion conducting particles to form a lithium ion conducting membrane, wherein at least a portion of the ion conducting particles in the membrane have a first exposed surface projecting from a first side of the layer of the polymer and a second exposed surface projecting from an opposed second side of the layer of the polymer, wherein the exposed surfaces are substantially free of the polymer; and (d) removing the adhesive layer from the ion conducting particles.

In another embodiment, the present disclosure is directed to a device, including: a circular membrane including comprising a polymer selected from cyclo-olefin polymers, poly-para-xylylenes, benzocyclobutenes, olefin addition polymers and copolymers, ring opening metathesis polymers and reduced forms thereof, acyclic diene metathesis polymers and reduced forms thereof, fluorocarbon addition polymers, fluoroether polymers, ring opened cyclobutyl fluoroethers, polyarylenes, polyarylene ethers, polybenzoazoles, polysiloxanes, silsequioxanes, polycarbosilanes, and mixtures and combinations thereof; metal oxide lithium ion conducting particles in a central circular region of the membrane, wherein at least a portion of the particles have a first exposed surface projecting from a first side of the membrane and a second exposed surface projecting from an opposed second side of the membrane, and wherein the exposed surfaces of the conducting particles are substantially free of the polymer, and wherein an annular region of the membrane surrounding the central circular region is free of metal oxide lithium ion conducting particles.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the figures indicate like elements.

DETAILED DESCRIPTION

Figure 2A:
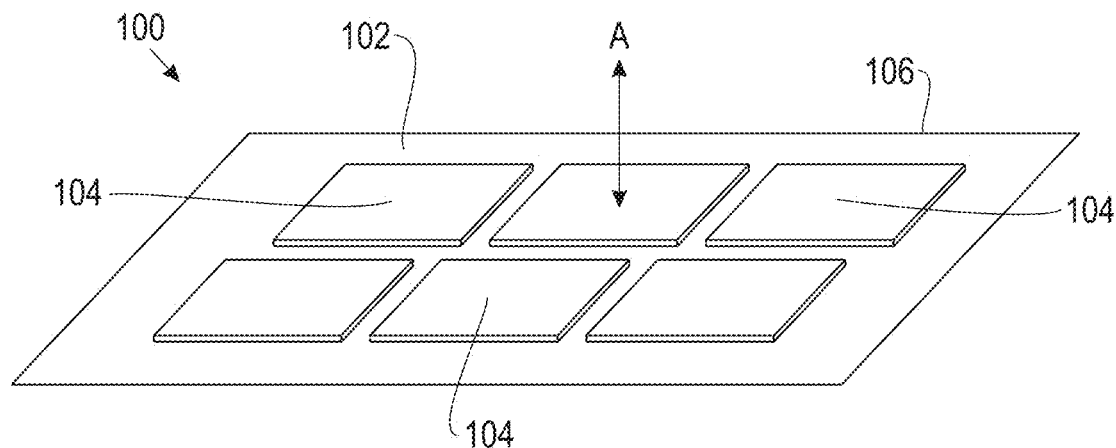
FIG. 2A is a schematic tilted plan view of an ion-conducting hybrid membrane composed of LIC tile.
Figure 2B:
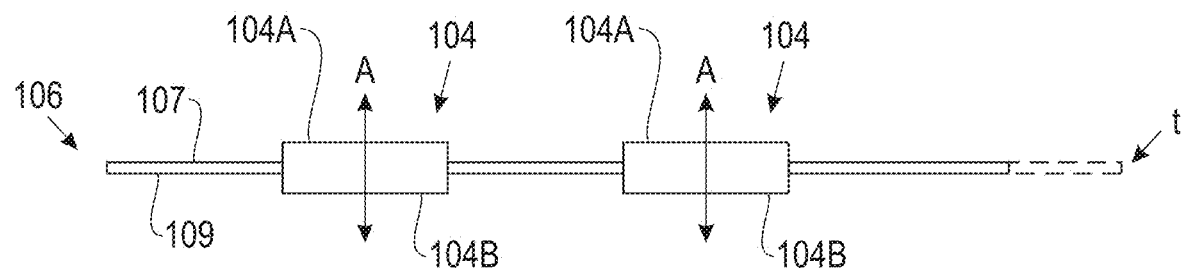
FIG. 2B is a cross-sectional view of the membrane of FIG. 2A.

FIG. 2A shows a hybrid ion conducting membrane 100 including an array 102 of inorganic ion-conducting elements 104, in this case tiles, embedded in a polymeric matrix material 106. As shown in FIG. 2B, the ion-conducting elements 104 span the thickness t of the polymeric material 106 and extend from a first major surface 107 of the polymeric material 106 to a second major surface 109 thereof. This construction allows ions to flow freely in the direction A between first surfaces 104A of the ion conducting elements 104 to the second surfaces 104B thereof. In the embodiment shown in FIG. 2A, the ion-conducting elements 104 are tile-like blocks, but it should be understood that the elements 104 can have any suitable shape, and may be arranged in a regular or irregular array within the polymeric matrix 106. The ion-conducting elements 104 can be arranged in a single layer as shown in FIG. 2A and 2B, or at least some of the elements 104 may overlie one another, but a single layer arrangement is preferred to provide optimum ion conductivity and avoid impedance at contact interfaces. In some embodiments, some of the ion conducting elements 104 in the array 102 may not span the full thickness t of the polymeric matrix 106, but to provide good ion conductivity it is preferred for a majority of the elements 104 in the array 102 extend fully from the first major surface 107 of the matrix 106 to the second major surface 109 thereof.

In one example that is not intended to be limiting, for use as a LICM in a lithium oxygen battery, the matrix polymer 106 should have at least some of the following characteristics: (i) little or no water absorption; (ii) impermeable to gases, particularly $CO_2$ and oxygen; (iii) little or no swelling in solvents typically employed in electrolyte mixtures, which are often polar; (iv) strong adhesion to Li-ion conducting particles; (v) good mechanical properties such as modulus and toughness; and (vi) be easily applied as a solution by, for example, spinning, dip coating, gas phase deposition, spraying, and the like. In general, non-polar polymers have been found to be suitable, and in some embodiments these polymers have a glass transition temperature ($T_g$) greater than 80° C., or greater than 100° C.

In some example embodiments, for solution deposition of the matrix polymer, either addition or ring opening metathesis polymer (ROMP) cyclic polyolefin polymers can be used. In the latter case, the unsaturation is removed by hydrogenation. Suitable examples include, but are not limited to, COP (cyclo-olefin polymers) and COC (cyclo-olefin copolymers), particularly hydrocarbon ring opened copolymers. Such materials are available commercially from Zeon Corp., Japan, as either the Zeonor or Zeonex series. In some embodiments, the COP had a $T_g$ of greater than about 100° C., or about 106° C. Other matrix materials include, but are not limited to olefin addition polymers and copolymers, ring opening metathesis polymers including reduced forms, acyclic diene metathesis polymers including reduced forms, fluorocarbon addition polymers, fluoroether polymers, ring opened cyclobutyl fluoroethers, polyarylenes and polyarylene ethers, polybenzoazoles, polysiloxanes, silsequioxanes, polycarbosilanes, and mixtures and combinations thereof.

In another embodiment, the matrix polymer may be prepared by the Parylene process, a vapor deposition polymerization process utilizing materials available from Parylene Engineering, Redmond, Wash. The Parylene process is a high temperature monomeric cracking process followed by reactive monomer polymerization that forms a poly-para-xylylene conformal coating film using chemical vapor deposition (CVD). The polymerization can take place at room temperature or below. Parylene C, the mono-chloro substituted compound, which has good thermal stability, has been found to be suitable. Parylene N, the un-substituted compound, or Parylene D, the di-chloro-substituted compound, may also be suitable depending on desired dielectric and high temperature endurance properties of the matrix polymer coating, as would fluorinated Parylenes such as AF4.

The matrix polymer may also be a thermosetting polymer such as, for example, a benzocyclobutene resin available under the trade designation CYCLOTENE from Dow Chemical, Midland, Mich. Thermosetting behavior could also be induced by radiation treatment.

Referring again to FIGS. 2A-2B, the ion conducting elements 104 can be made from a wide variety of materials, depending on, for example, which ions are to be conducted across the hybrid membrane 100 and the level of conductivity required in the membrane 100. In one non-limiting example embodiment, the ion conducting elements can be in the form of tiles (FIGS. 2A-2B) that have predetermined uniform shape and size, and in other embodiments may be particles (FIGS. 3A-3F below) having uniform or non-uniform shapes and sizes.

The following discussion will focus on lithium ion conducting materials, but it should be emphasized that the present disclosure is not limited to such materials. In addition to Li$^+$ ion conducting materials, a wide variety of solid state ion conducting elements may potentially be used to conduct ions such as, for example, Na, H$^+$, K, Fe, Zn, Mg, Ca and combinations thereof.

Non-limiting examples of solid state ion conducting elements suitable for use in a LICM for a lithium oxygen battery include ceramic lithium ion conductors, such as polymer-ceramic composites, non-oxide inorganic materials, perovskite-type oxides, garnet-type oxides, $Li_3PO_4$ oxides, NASICON-type (Sodium Super Ionic Conductor) materials, LISICON (Lithium Ion Super Ionic Conductor) and single crystal membranes.

Many inorganic materials have been considered as lithium ion conductors. Non-oxide materials include polycrystalline LiI and samples doped with $CaI_2$. In some embodiments, the addition of ceramic materials such as $Al_2O_3$ can improve lithium ion conductivity. Crystalline materials such as $Li_3N$ and $Li_{1/3-x}Li_{3x}NbO_3$ show a high ($10^{-3}$ S/cm) and highly isotropic conductivity that can be increased by doping. Glassy lithium sulfide containing $Bi_2S_3$, $SiS_2$, $Li_3(PO_4)$, $Li_2S$—$SiS_2$—$Li(PO_4)_3$ and the like can reach conductivities of $7\times10^{-4}$ S/cm.

Solid state lithium ion conductors can include complex metal oxides such as, for example, Perovskite-types such as $Li_{3x}La_{(2/3)-x}TiO_3$(LLTO) with A-site vacancies, which have achieved lithium ion conductivities of $10^{-3}$ S/cm in single crystals (lithium lanthanum titanate or LLTO). Polycrystalline LLTOs have conductivities of >$10^{-5}$ S/cm, and high temperature annealing leads to loss of Li. The structure and synthesis of these compounds are described in, for example, S. Stramare et al., *Chem. Mater.* 2003, 15, 3974; K. Kitaoka et al., *J. Mater. Sci.* 1997, 32, 2063; Y. Inaguma et al., *J. Ceramic Soc. Jpn. Int. Ed.* 1997, 105, 597; and A. Varez et al., *J. Mater. Chem.* 2001, 11,125.

Other suitable ceramic-like Li ion conductors include garnet-like oxides ($Li_xLa_3M_2O_{12}$, M=Zr, Nb, Ta, Sb, Bi). These materials can be processed at lower temperatures minimizing the loss of Li. Doped samples show Li ion conductivity in the $10^{-4}$-$10^{-5}$ S/cm range. The structure and synthesis of these compounds is discussed in, for example, *Solid State Ionics* 2009, 180(14-16), 911; Y. Shimonski et al., *Solid State ionics* 2011, 183(1), 48.

A class of lithium conductors called Li$^+$super ionic conductors, LISICON, e.g., $Li_{2-2x}Zn_{1-x}Ge(O)_4$, has good conductivity at elevated temperatures and room temperature conductivities of >$10^{-5}$ S/cm. Oxygen can be replaced by sulfur to form thio-LISICON to improve ionic mobility. Ceramic materials such as $Li_7P_3S_{11}$ can have conductivities of ~$10^{-3}$ Scm$^{-1}$. The structure and synthesis of these compounds is discussed in, for example, H. Y. -P. Hong *Mater. Res. Bull.* 1978, 13, 117; P. G. Bruce et al., *J. Electrochem. Soc.* 1983, 130, 662; A. D. Robertson et al., *Solid State Ionics* 1997, 104, 1.

Another class of Li-ion conductors called NASICONs with a general formula of $LiM_2(PO_4)_3$; M=Ge, Ti, Hf, Zr, can be used, and substitution of some of the M sites with trivalent ions (e.g., Al, Ga, Fe, La, etc.) can lead to increased incorporation of Li ions. For example, $Li_{1.3}Al_{0.3}Ti_{1.7}(PO_4)_3$(LATP) shows a Li ion conductivity of >$10^{-3}$ at room temperature. Sintering tends to increase the density and improve the conductivity for polycrystalline samples. Li ion conductivity has also been demonstrated in single crystal Si membranes but the conductivity is substantially less than demonstrated by NASICON materials. The structure and synthesis of these compounds is discussed in, for example, I. Y. Pinua et al., *Inorganic Mater.* 2009, 45(12), 1370.

Another suitable class of materials includes thio-LiSICON materials ($Li_{3.25}Ge_{0.25}P_{0.75}S_4$), which have conductivities on the order of $10^{-3} Scm^{-1}$. One non-limiting example includes materials with composition ($Li_{10}GeP_2S_{12}$), which have been reported to have high ion conductivities of about $10^{-2} Scm^{-1}$.

As one example, for lithium-oxygen battery applications using aqueous electrolytes, glassy ceramic membranes such as $LiM_2(PO_4)_3$ have been used, wherein M=Ge, Ti, Hf, Zr. The ceramic may optionally be protected with a PEO (polyethylene oxide) protective laminate film to isolate the inorganic material from the lithium metal anode.

Figures 3A, 3B:
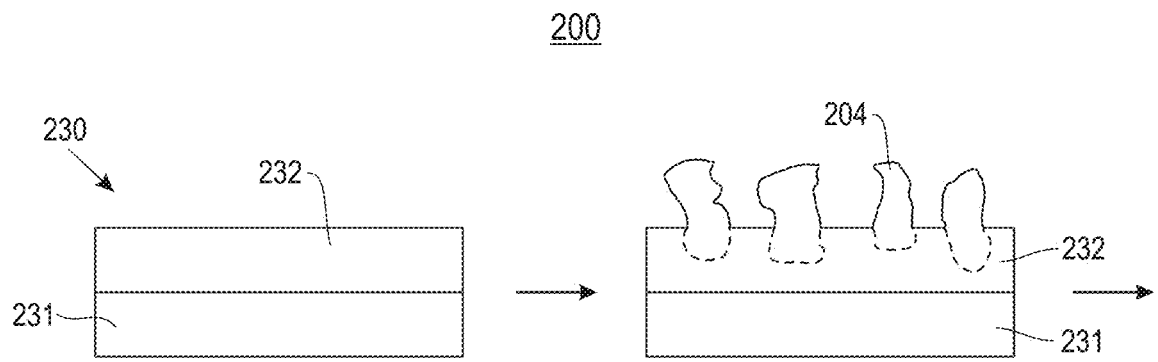
FIGS. 3A-3F are schematic cross-sectional views of an embodiment of a process for making an ion-conducting hybrid membrane.

FIGS. 3A-F illustrate an embodiment of a method 200 for making a hybrid ion-conducting membrane. In FIG. 3A, an adhesive tape 230 includes an adhesive layer 232 on a removable liner or backing substrate 231. Suitable adhesive tape constructions include, but are not limited to, tapes available from Nitto Denko, Fremont, Calif., under the trade designations ELP UB 2130E, ELP DU-300, which can be either removed by the application of thermal energy or ultraviolet (UV) radiation; the PW(Pross Well)/TRM series of heat resistant adhesive tape from Nitto Denko; water soluble adhesive tape such as, for example, tapes with poly(vinyl) alcohol having a thin water soluble adhesive layer available from 3M, St. Paul, Minn., under the trade designation water soluble wave solder tape 5414; or, polyethylene oxide (PEO) adhesives containing the electrolyte lithium bistrifluoromethane sulfonyl imide (BTFMSI).

In FIG. 3B, ion conducting tiles or particles 204 are applied on the adhesive layer 232 to form a regular or irregular array, preferably forming a single layer over all or a portion of the adhesive layer 232. The ion conducting particles may optionally be sieved prior to application to the adhesive layer 232 to ensure that the particles are more uniform in size and/or shape.

In various embodiments, the mean particle size should not be greater than 100 microns, and a mean particle size of less than 90 microns, less than 60 microns, less than 45 microns, or less than 30 microns have also been found to be suitable, although particles with a mean particle size less than 50 microns are generally preferable. Smaller sizes lead to higher ionic conductance, but average particle sizes of less than 15 microns produces membranes that are fragile, difficult to handle, and susceptible to the formation of pinholes. Since the average thickness of the membrane is dictated by the largest particles, the size distribution is preferably less than 10% of the mean, such that the smallest particles may protrude through the opposing surfaces. As shown in FIG. 3B, the ion-conducting particles adhere to and/or become embedded in the adhesive layer 232.

Figures 3C, 3D:
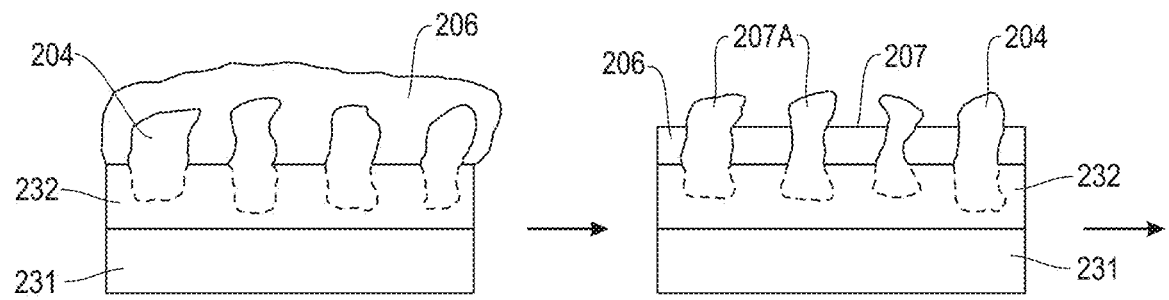

In FIG. 3C, a matrix polymer layer 206 is formed over the particles 204. The matrix polymer layer 206 may be applied by a wide variety of deposition techniques including, but not limited to, spinning, vapor phase deposition, dip coating, spraying and the like.

Following and/or during application, the matrix polymer layer 206 may optionally be further processed to improve its properties for use in subsequent process steps. For example, the matrix polymer may be heated or annealed to remove residual solvent and promote polymer flow, annealed in the presence of a plasticizing solvent in the vapor phase, exposed to radiation for hardening or crosslinking, and the like. For solution processing of the polymer, the polymer must be soluble in the casting solvent, or, if available as insoluble nanoparticles, they should preferably be dispersible in a solvent. For thermoplastics, the sample is usually heated above the polymer $T_g$ to remove solvent and promote polymer flow. Alternatively the polymer may be annealed in the presence of a solvent vapor that results in plasticization of the matrix. If the matrix material is thermosetting, the polymer is heated above the temperature where crosslinking occurs. Alternatively, various forms of radiation may be used to initiate crosslinking. Water soluble adhesives may be preshrunk by heating prior to the addition of the particles and matrix polymer.

In FIG. 3D, a portion of the matrix polymer layer 206 is removed if necessary to expose a portion of at least some of the conducting particles 204, such that at least a portion of the particles 204 protrude from the matrix polymer layer 206 and have at least one surface 207A that protrudes from a surface 207 of the matrix polymer layer 206. The surface 207A of each particle 204 is substantially free of the polymer making up the polymer layer 206. The portions of the matrix polymer layer 206 can be removed by any suitable method, for example, soaking in aqueous or organic solvents, polishing, oxygen plasma etching, reactive ion etching, ion milling or any combination thereof. Ion milling has the potential advantage of directional milling which may be useful for removing polymer from the tops of the particles 204 in conformal coatings while reducing the etch rate of the polymer making up the matrix polymer layer 206.

Figures 3E, 3F:
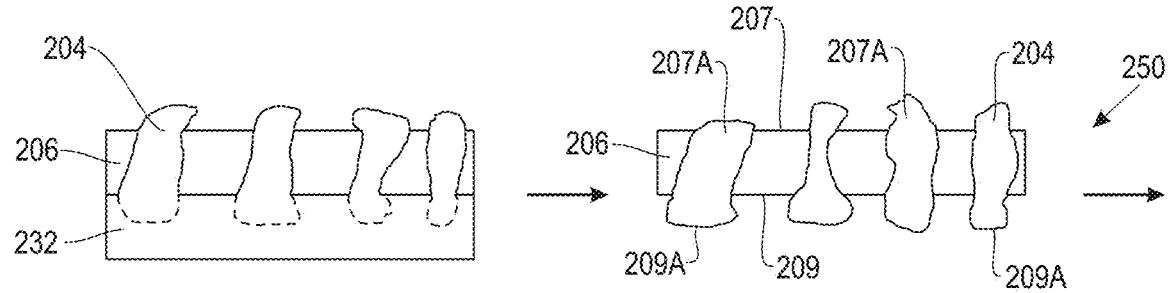

In FIG. 3E, the substrate 231 is stripped or otherwise removed from the adhesive layer 232. In some alternative embodiments, the substrate 231 may be removed prior to or at the same time the matrix polymer layer 206 is removed.

In FIG. 3F, the adhesive layer 232 is removed to form a hybrid ion conducting membrane 250. The adhesive layer 232 may be removed by, for example, peeling, dissolution, oxygen plasma etching, ion milling or the like.

After removal of the adhesive layer 232, at least a portion of the protruding particles 204 have a first protruding surface 207A that extends from a first side 207 of the matrix polymer layer 206, and a second protruding surface 209A that extends from a second side 209 of the matrix polymer layer 206. In various embodiments, after the removal of the adhesive layer 232, a portion, or a majority, or all, of the particles 204 span the entire thickness of the matrix polymer layer 206.

After removal of the adhesive layer 206, the particles 204 are preferably arranged in a single layer so that ions may conduct freely therethrough without encountering resistance at interfaces between overlying particles.

Figures 4A, 4B:
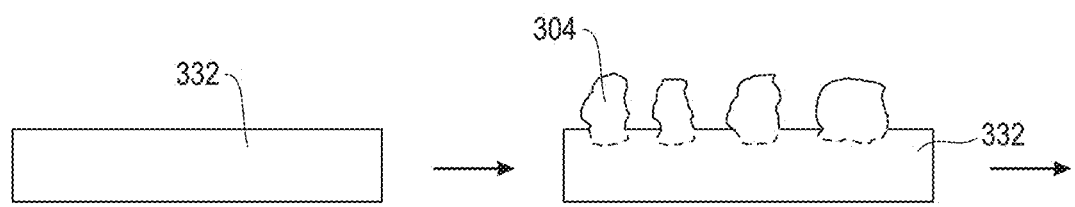
FIGS. 4A-4E are schematic cross-sectional views of an embodiment of a process for making an ion-conducting hybrid membrane.

FIG. 4 illustrates another method 300 for making an ion-conducting membrane. In FIGS. 4A-4B, an adhesive layer 332 has applied thereon ion conducting tiles or particles 304 to form a regular or irregular array, preferably forming a single layer over all or a portion of the adhesive layer 332. The ion conducting particles 304 may optionally be sieved prior to their application to the adhesive layer 332 to ensure that the particles are more uniform in size and/or shape.

In most cases the polymer covers and adheres to the particle surface without prior treatment, leaving no gaps between the polymer and particle. In situations where this is not the case, a solution or vapor phase surface functionalization of the surface may be initiated to promote adhesion. Since the ceramic materials are oxides, surface treatments utilized for silica surfaces and particles can be utilized. Similarly, suitable procedures used for surface functionalization of basic metal oxides such as iron or titanium oxide may be employed if necessary.

As shown in FIG. 4B, the ion-conducting particles 304 adhere and/or become embedded in the adhesive layer 332 to permit further overcoating and processing steps.

Figures 4C, 4D:
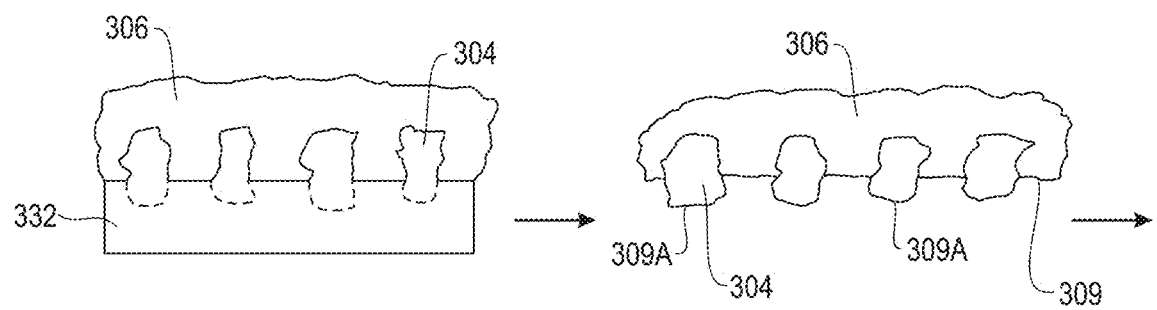

In FIG. 4C, a matrix polymer layer 306 is deposited over the particles 304 by any suitable method such as, for example, spinning, vapor phase deposition, dip coating, spray coating and the like. Following and/or during application, the polymers in the matrix polymer layer 306 may optionally be further processed to improve its properties for use in subsequent process steps. For example, the polymers in the layer 306 may be heated or annealed to remove residual solvent and promote polymer flow, exposed to radiation for hardening or crosslinking, and the like.

In FIG. 4D, the adhesive layer 332 is removed to expose a portion of at least some of the conducting particles 304, such that at least a portion of the particles 304 protrude from the matrix polymer layer 306 and have at least one surface 309A that protrudes from a surface 309 of the matrix polymer layer 306. A part of the surface 309A is substantially free of the polymer making up the polymer layer 306. In various embodiments, at least a portion of the particles 304 have a substantially polymer free surface. The adhesive layer 332 may be removed by any suitable method, and peeling, dissolution or oxygen reactive ion etching have been found to be particularly effective.

Figure 4E:
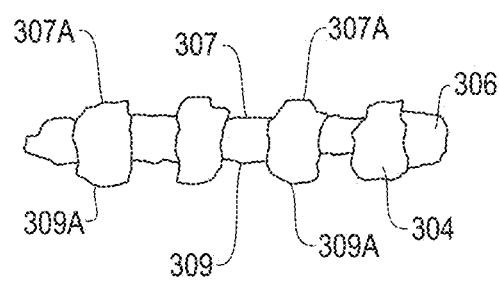

In FIG. 4E, a portion of the matrix polymer layer 306 is removed to expose a portion of at least some, or a majority, or all, of the conducting particles 304, such that the particles 304 protrude from the matrix polymer layer 306. The matrix polymer layer 306 can be removed by any suitable method, for example, polishing, oxygen plasma etching, ion milling or a combination thereof.

After removal of the desired portion of the matrix polymer layer 306, at least a portion of the particles 304 have at least two surfaces that protrude from the matrix polymer layer 306 and are substantially free of the polymer making up the matrix polymer layer 306. Each of the protruding particles 304 has a first protruding surface 309A that extends from a first side 309 of the matrix polymer layer 306, and a second protruding surface 307A that extends from a second side 307 of the matrix polymer layer 306. In various embodiments, after the removal of the selected portion of the matrix polymer layer 306, a portion, or a majority, or all, of the particles 304 span the entire thickness of the matrix polymer layer 306. The particles 304 are preferably arranged in a single layer so that ions may conduct freely without encountering resistance at interfaces between overlying particles.

Figure 5A:
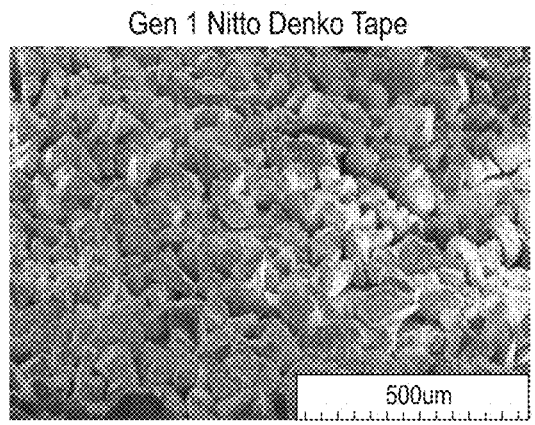
FIGS. 5A-5C are scanning electron microscope (SEM) images of lithium ion conducting particles dispersed on adhesive backings.
Figure 5B:
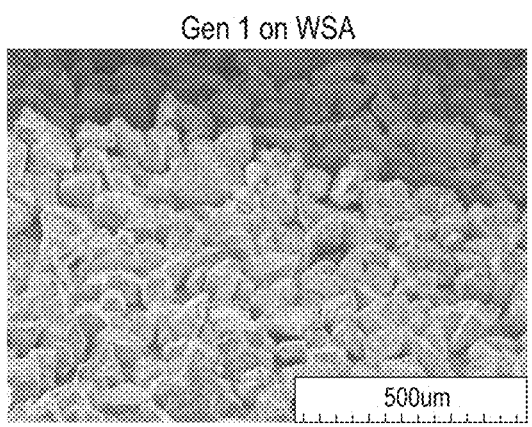
Figure 5C:
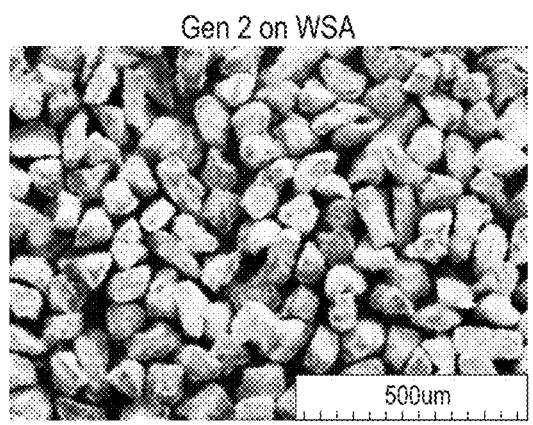

Some representative pictures of particle assemblies on various adhesive substrates are shown in FIGS. 5A-5C. Lithium ion conducting glass particles referred to herein as sample 1 and sample 2 were obtained from Schott Glass, Mainz Germany. The sample 1 particles were a NASICON type with generic formula $Li_{1-x}Al_x(PO_4)_3$ (LATP) with x=3, while sample 2 was derived from a Garnet-like elemental composition of $Li_7La_3Zr_2O_{12}$ (LLZO) doped with Al. The particle size distribution for the LATP particles as received ranged from 30-90 microns while the size distribution for the LLZO particles was more homogeneous.

FIG. 5A shows the sample 1 particles on a thermal release adhesive tape substrate obtained from Nitto Denko, FIG. 5B shows sample 1 particles on a water soluble adhesive tape available from 3M, and FIG. 5C shows the sample 2 particles on the 3M water soluble adhesive tape.

If contact with electrodes and/or electrolyte is to be established on both sides of the matrix polymer layer, it is preferred that the particle size distribution be narrower before coating the matrix polymer, because small particles in the presence of larger ones may not have exposed protruding surfaces that make good contact on both sides of the membrane construction. This situation is exacerbated in the configuration where the array of ion conducting particles is only one particle thick, and for such single layer constructions the particles are preferably sieved before use to narrow the particle size distribution.

Figure 6A:
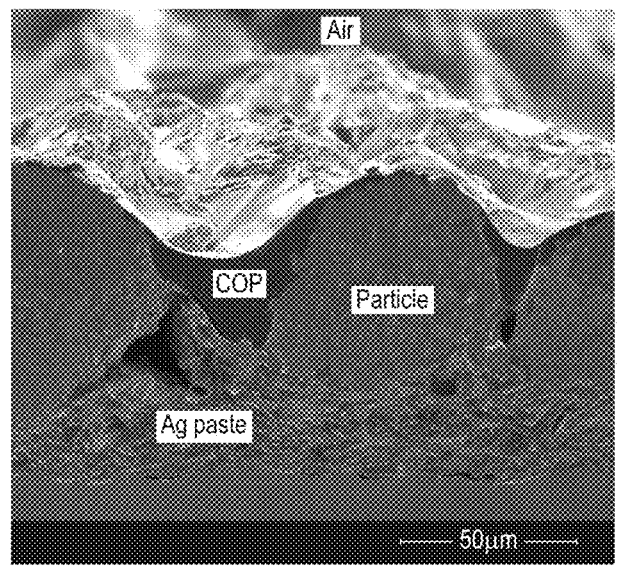
FIGS. 6A-6B are cross-sectional SEM images of sieved and un-sieved lithium ion conducting particles on adhesive backings.
Figure 6B:
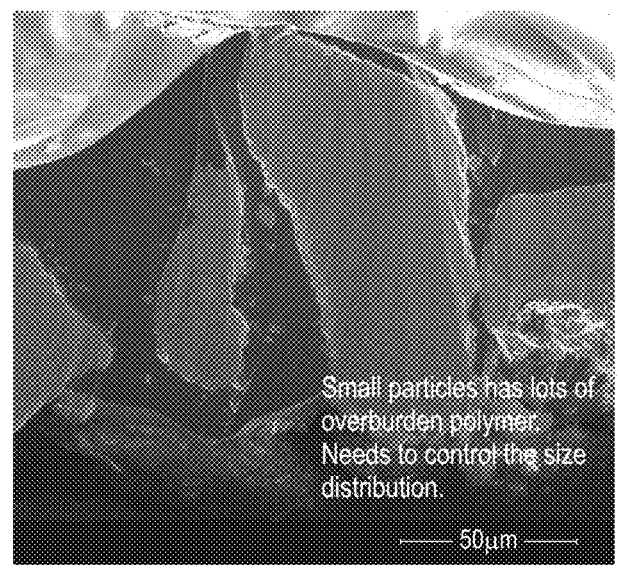

FIGS. 6A-6B illustrate the potential effect of having a wide distribution of particle sizes, and are not intended to be limiting. As shown in FIG. 6A, sieved particles of similar size have a similar amount of overburden of the polymer making up the matrix polymer layer, which increases the likelihood that removal of the overlying polymer will expose surfaces of a large overall percentage of the particles in the array. As shown in FIG. 6B, if the particles are not sieved, the smaller particles have a significant overburden of the polymer making up the matrix polymer layer, and it becomes less likely that these smaller particles will have exposed surfaces when a selected portion of the matrix polymer is subsequently removed.

Figure 7:
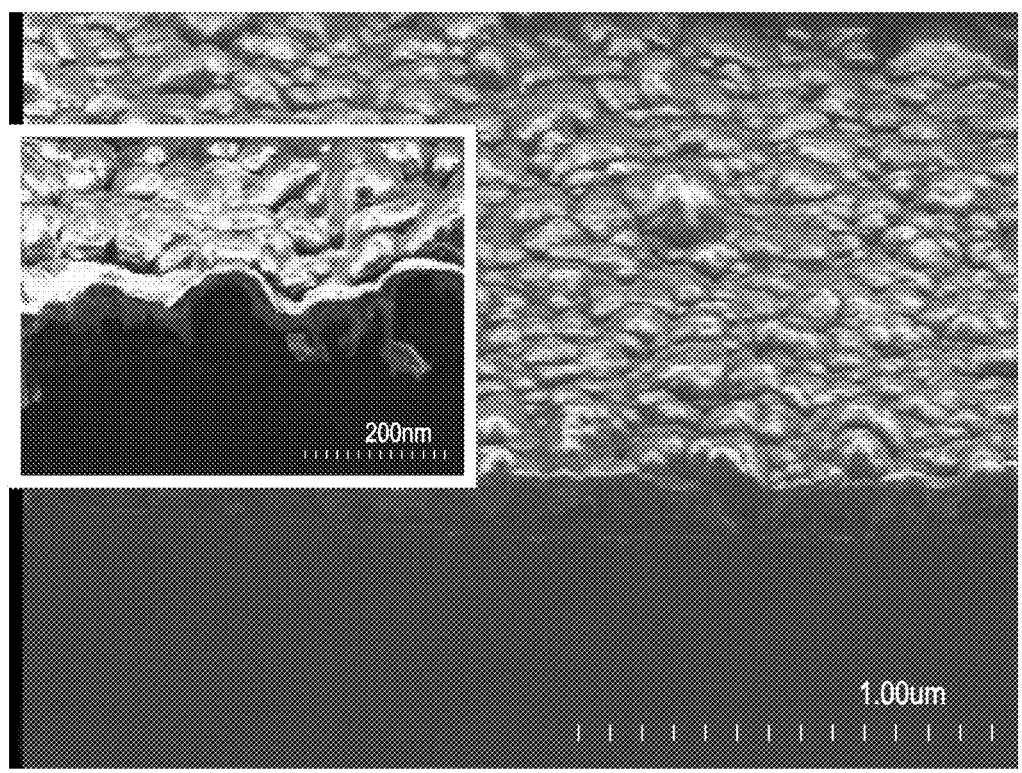
FIG. 7 is a SEM image of lithium ion conducting particles on an adhesive substrate that have been coated with a layer of a polymer including parylene C applied by vapor deposition.

FIG. 7 shows a sample of assembled (LATP) particles on a water soluble adhesive layer, which is coated by gas phase deposition of the matrix polymer Parylene C. The matrix polymer coating is conformal, the quality of the coating coverage is quite good, and films thicker than 50 microns are easily prepared. Post-deposition annealing of the matrix polymer does not lead to planarization at temperatures below the decomposition temperature of the polymer. Although planarization of polymer films made by the Parylene process has been reported for high temperature deposition, these conditions may in some cases cause thermal instability of the water soluble adhesive substrate.

Figure 10D:
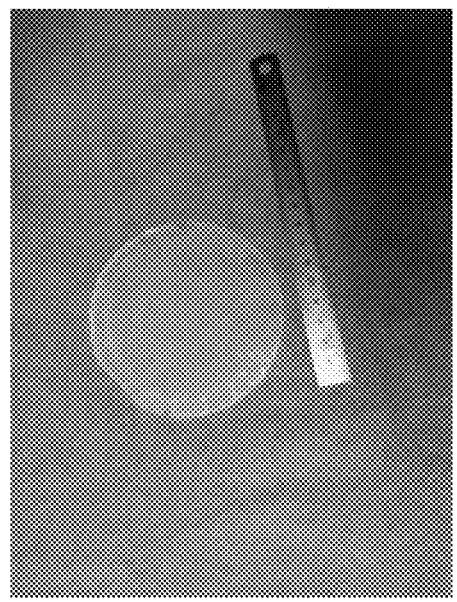
FIGS. 10A-10D are photographs of large area membranes made using the materials and procedures described in this disclosure.
Figure 10C:
Figure 10B:
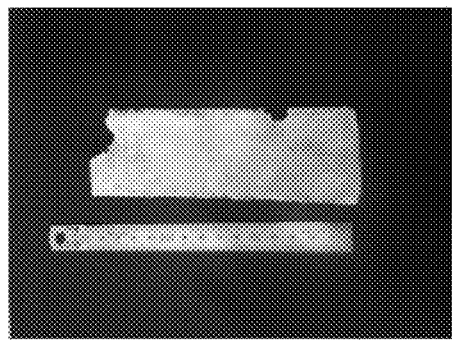
Figure 10A:
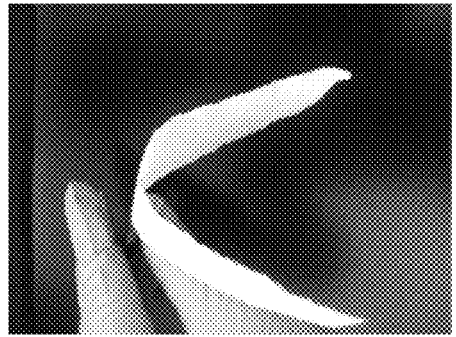

The hybrid ion conductive film is quite flexible and can be prepared for large area applications. For example, FIGS. 10A-10D show the size of a processed membrane sheet (about 5 cm×15 cm) after removal of the backing and its flexibility. FIGS. 10A-10C show a film prepared using a COP as the matrix polymer in which a water soluble adhesive was used for particle assembly, while FIG. 10D shows a 4 inch (10 cm) hybrid ion conducting film prepared using PEO-BTFMI adhesive for assembly of the particles.

Although processing of hybrid films can reduce the matrix polymer overburden, in many embodiments the overburden cannot be completely eliminated from all the particles in the array. To further remove the matrix polymer and expose the surfaces of more ion conducting particles, particularly with carbon-based polymers, oxygen reactive ion etching ($O_2$-RIE) may optionally be used alone or in combination with other polymer removal methods. The fact that the inorganic lithium ion conducting materials are already oxidized means that they are largely impervious to the oxidative plasma conditions. If water soluble adhesives are used, once the adhesive is dissolved and removed, the exposed particles are largely free of the adhesive polymer and consequently need little etching.

Figure 11A:
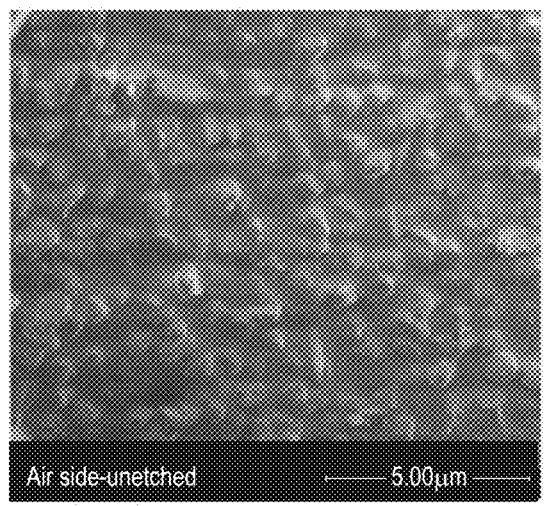
FIGS. 11A-11C show a plan view in which a cyclo-olefin polymer (COP) matrix polymer has been removed from portions of the conductive ion particles with oxygen reactive ion etching.
Figure 11B:
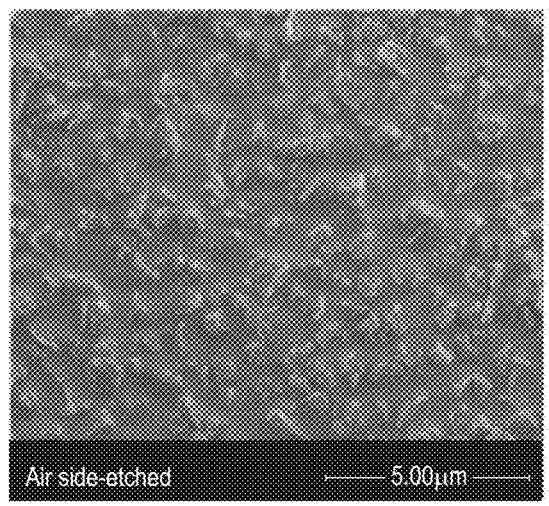
Figure 11C:
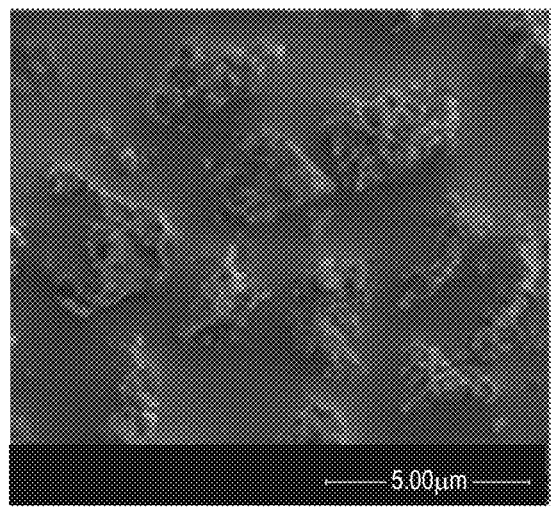

The predominant need is for polymer removal from the air interface for each particle. In some embodiments, polymer removal from the covered ion conducting particles was more rapid than removal of the polymer from the crevices in between particles, which leads to clearance of the polymer overburden from the surfaces of the particles without excessive thinning of the matrix polymer layer. This is demonstrated in FIG. 11, which shows samples with a COP matrix polymer and a water soluble adhesive used for particle assembly, in which $O_2$-RIE was used to remove the matrix polymer from the surfaces of a plurality of the ion conducting particles.

A hybrid membrane was prepared and tested for permeance using a technique approved by the Japanese Industrial Standards Committee (JIS P8117) to determine whether there were pinholes introduced during processing to remove portions of the matrix polymer layer. The test involved measurement of the time required for 100 cc of air to diffuse through the matrix polymer layer using a pressure gradient (see FIG. 13).

Figure 13:
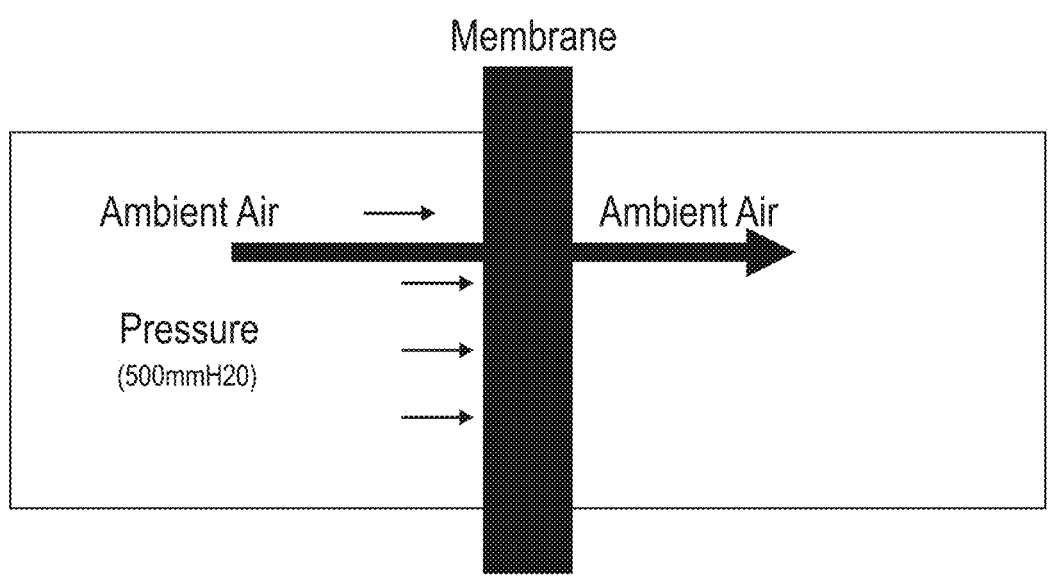
FIG. 13 is a schematic diagram of an air permeance test apparatus and method.

The hybrid ion conducting membrane tested in FIG. 13 was prepared from the LATP lithium ion conducting particles coated 5× with the COP matrix polymer solution by spin coating. The sample was dried and the adhesive backing removed using an ethanol soak at 70° C. for 1 day. The film sample was then allowed to stand for 10 days at room temperature prior to the measurement. This membrane sample was not etched using $O_2$-RIE. The measurements in FIG. 13 show a very low permeance that was below the detection limit.

The data for the hybrid membrane together with comparison with commercial LIB separator materials are shown in Table 1 below.

TABLE 1

Air Permeance Measurements:
Time to Pass 100 cc of Air (seconds)

| Glass Fiber | 1 |
| CG2400 (Celgard, LIB separator) | 480 |
| Hybrid Ion Conducting Membrane | >99999 |

Figure 1:
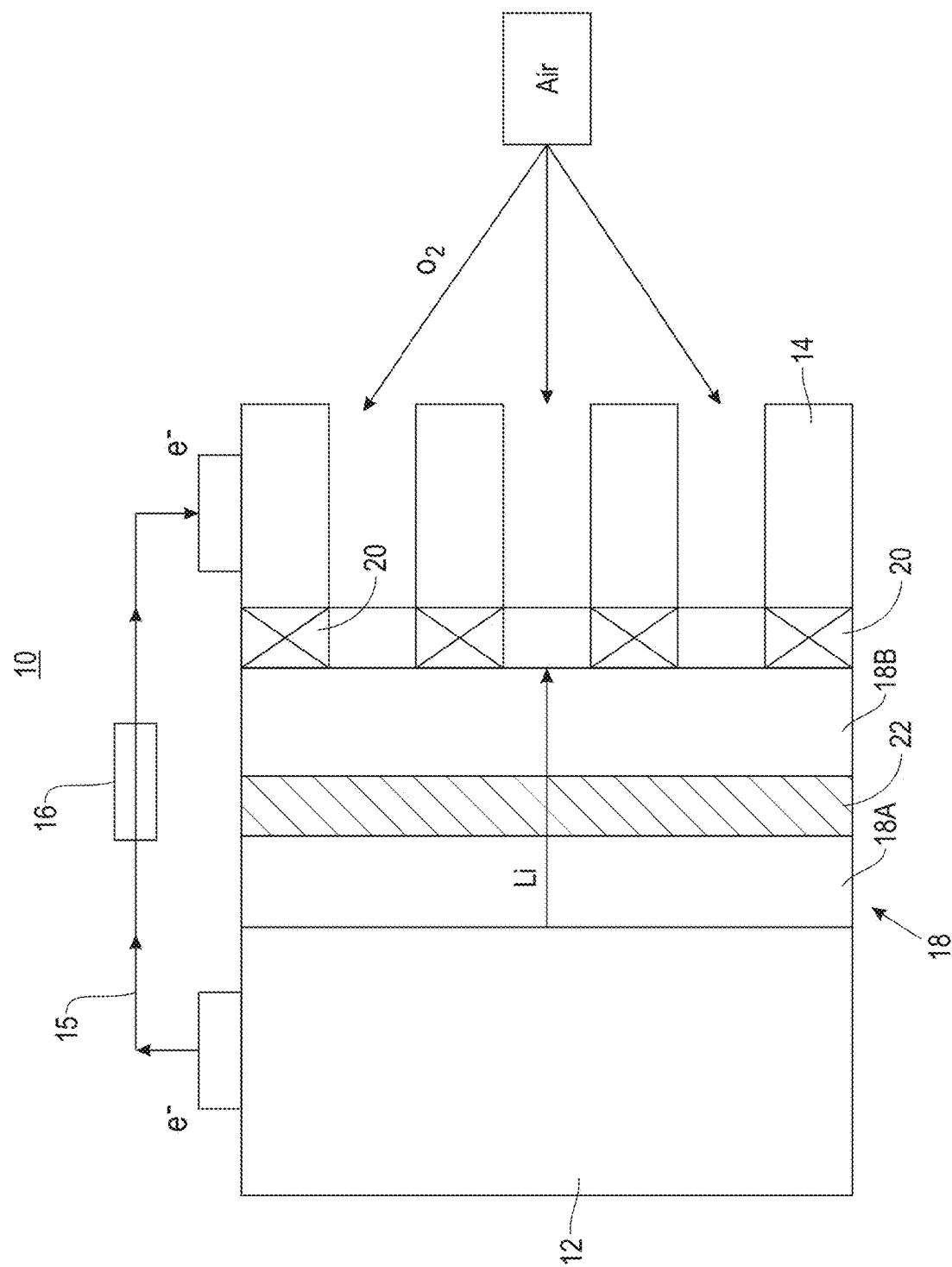
FIG. 1 is a schematic diagram of a lithium oxygen battery.

The ion conducting hybrid membranes described in this disclosure may be used in a wide variety of applications, but when made with lithium ion conducting particles are particularly useful as lithium ion conducting membranes (LICM) in any of the lithium oxygen battery constructions described herein in FIG. 1.

The invention will now be further described with reference to the following non-limiting examples.

EXAMPLES

Example 1

Preparation of a Hybrid Membrane Using a Water Soluble Adhesive (WSA)

The overall procedure of FIGS. 3A-3F was used. A layer of the water soluble adhesive tape was attached to a stainless steel substrate using tape to hold it in place with the sticky side up. Sieved ion conducting powder was distributed on the surface and the excess removed by shaking. This was repeated several times until good particle area coverage was achieved. The confining tape was then removed and a drop of decalin was added to the substrate bottom surface followed by re-application of the particle covered film. A soft connection (surface tension) was necessary to prevent wrinkling of the WSA film upon thermal processing which occurred when tape was used in the heating process. The particle covered film was held in place by surface tension and the substrate was heated to 130° C. for 20 minutes to preshrink the WSA. Layers of matrix polymer (Zeonor 1060R from Zeon Corp Japan) solution (8% by weight in decalin) were spun on the assembly at 300 rpm and the system heated to 90° C. for 20 minutes after each application. The applications were continued until the desired thickness was obtained (typically around 5 applications for this system).

Figure 8A:
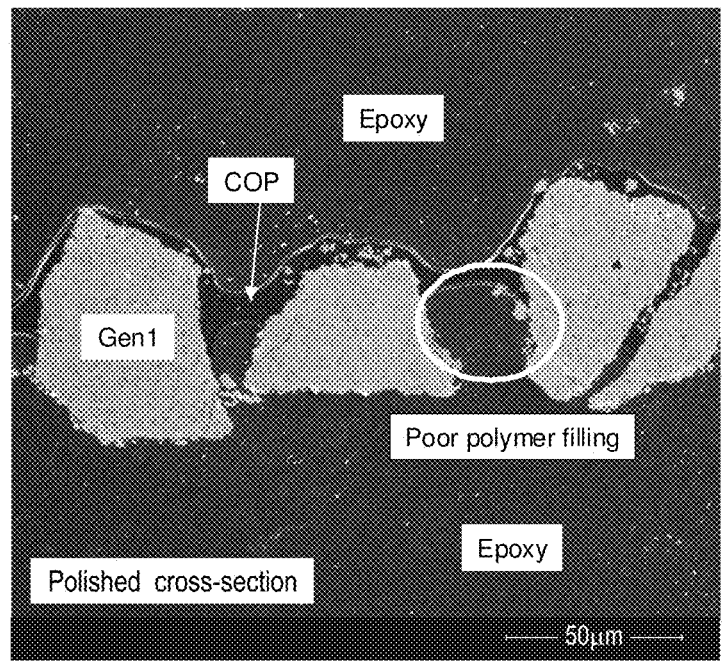
FIGS. 8A-8B are cross-sectional SEM images of lithium ion conducting particles overcoated with a cyclo-olefin matrix polymer.

FIG. 8A shows a SEM micrograph of an assembly that was heated to 90° C. after each layer of deposition of the COP matrix polymer material. Under these conditions, the gap filling of the polymer after spin coating was not ideal. In general, better gap filling was achieved using more dilute solution of the matrix polymer and controlling the film thickness by varying the number of coating steps.

Figure 8B:
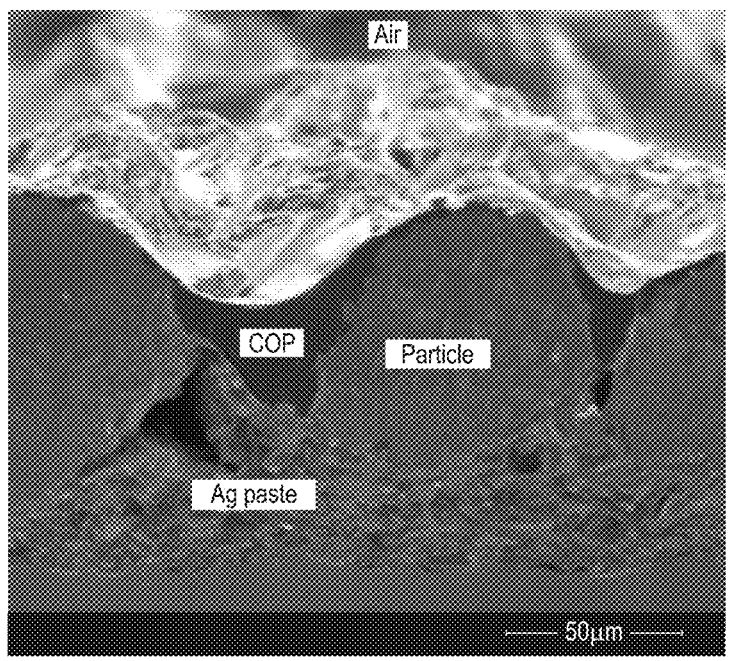

FIG. 8B shows a similar configuration where the assembly was annealed at 130° C. for 4 hours prior to removal of the adhesive coated backing. Here the gap filling is much improved by polymer flow ($T_g$ of about 106° C.). Similar improvement in gap filling was achieved by annealing the structure for 3 days at 90° C. in decalin vapor, although the procedure is more time consuming. The top down view shows that the coating is largely conformal after coating. The water soluble adhesive was removed by heating in ethanol for 5 days. Most of the backing is removed after one day but increased exposure was needed to complete the removal.

Figure 9:
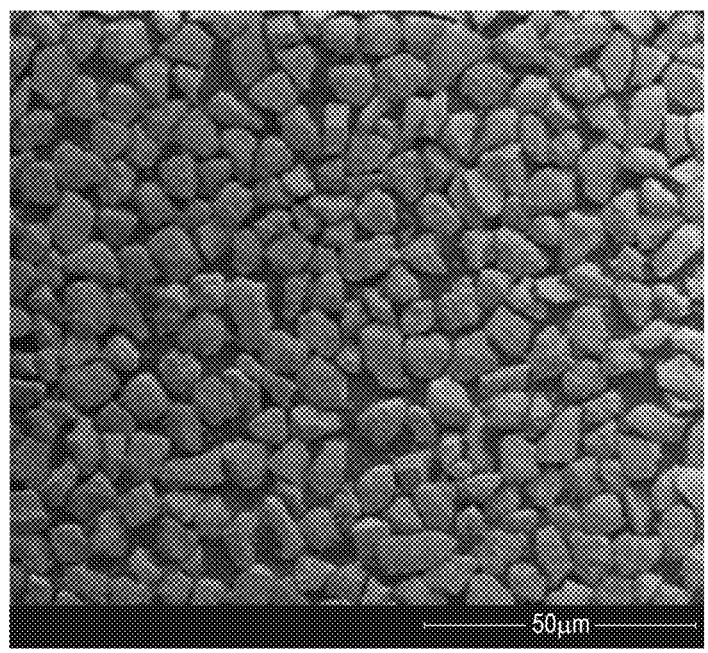
FIG. 9 is a plan view SEM image of a hybrid ion-conducting membrane, originally covered by a water soluble adhesive, following an ethanol soak.

FIG. 9 shows a plan view of the water soluble adhesive side of the assembly of FIG. 8B after removal of the adhesive layer and the backing. The ion conducting particles are clearly exposed and there seems to be very little residual polymer coating on the exposed surfaces thereof.

In another experiment, ion conducting particles were also be assembled on a surface containing a thin adhesive film of PEG ($M_w$=40,000) and lithium bistrifluoromethane sulfonyl imide (BTFMSI) (wt. ratio of about 20:1). The film was applied by spin coating the mixture from a solution of acetonitrile and drying at 90° C. The PEG w/o salt was solid and non-adhesive, but the addition of the electrolyte salt caused the film to become tacky enough to assemble and retain the ion conducting particles. Once again the particle assembly was accomplished by repeated dusting with the sieved particles and shaking off the excess.

The assembly was coated with a COP matrix polymer as described above. After heating the assembly to 130° C. for 4 hours, the adhesive and backing were removed by soaking in acetonitrile for 1 day. Under these conditions, the particles on the adhesive side were coated with a thin layer of COP and this surface appeared much more planar than with the water soluble adhesive (WSA) process.

In each case the polymer overburden can be removed by $O_2$-RIE or more slowly by off-axis argon ion etching (20 keV). Although the primary polymer overburden is on the air side of the assembly, some etching of the backside is also utilized, the extent of which depends on the amount of COP matrix polymer that appears on the adhesive side. The etching should be controlled to leave sufficient matrix polymer layer thickness so that shorts across the thickness of the matrix polymer layer are not produced after thermally coating with gold for electrical measurements. For this, an etch time of 4-6 minutes on the air side was employed with a much shorter etch on the WSA side (0.5-1 minute) but the removal rates depend on the etching conditions.

FIG. 10 shows plan view SEM images of assemblies using PEO-BTFMSI as the adhesive layer used to assemble the ion conducting particles. Again, a decreased number of spinning cycles reduced the polymer over burden, and post apply annealing at 130° C. improved the filling of gaps between the particles. The PEO adhesive layer was removed after the COP matrix polymer was applied by soaking for one day in acetonitrile at 70° C.

Example 2

Preparation of Hybrid Membranes Containing a Particle Free Polymer Collar to Allow Sealing in a Measurement Cell A similar procedure to that described in FIGS. 3A-3F was utilized, and an additional masking step was employed. A water soluble adhesive tape was placed on a substrate with the sticky side exposed. A mask containing a round 14 mm hole was attached to the water soluble adhesive. The mask was made from aluminum foil. Lithium ion conducting particles were applied by pouring them repeatedly on the adhesive tape and shaking off the excess. The mask was then physically removed and the COP matrix polymer solution applied by spinning as described in previous examples.

Figure 12:
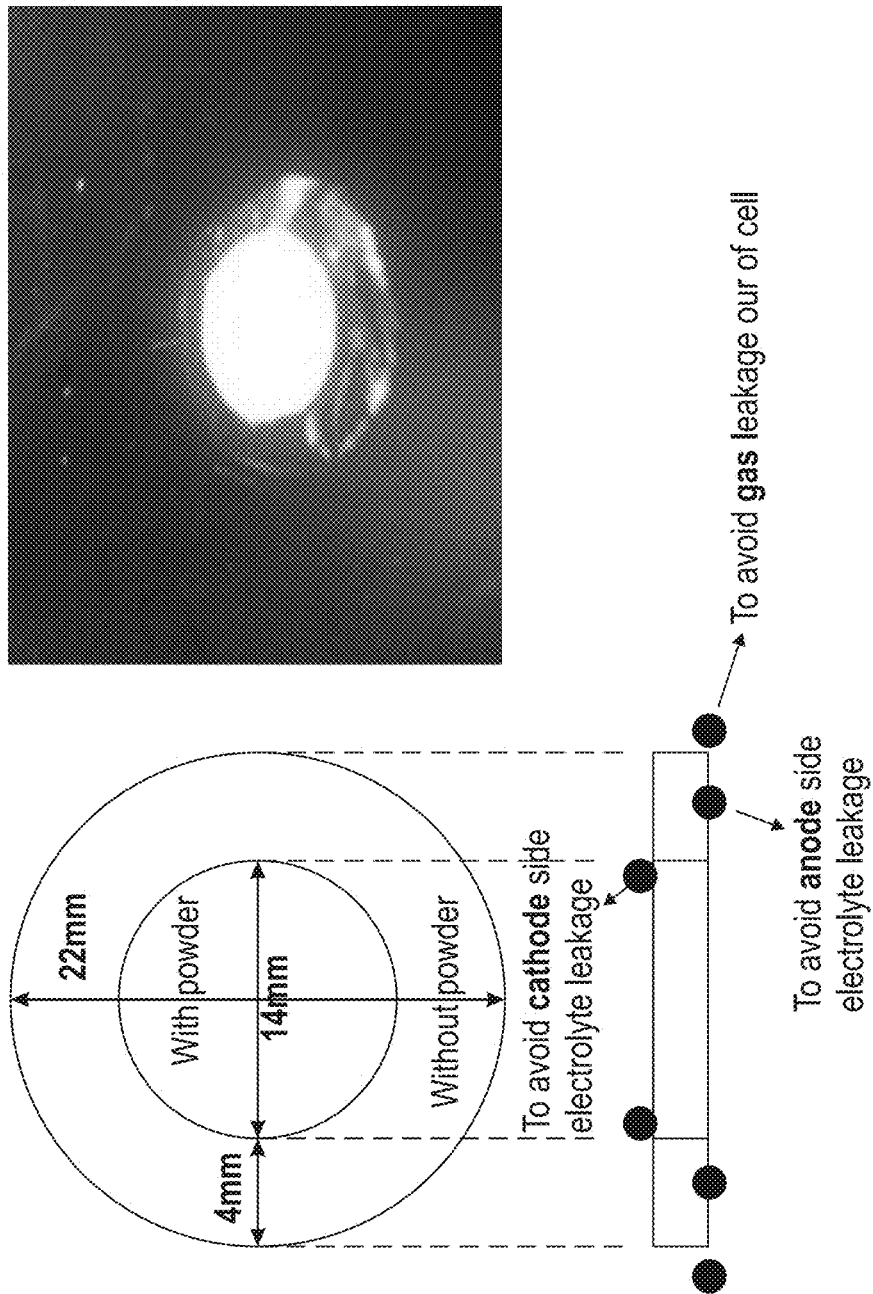
FIG. 12 is a schematic diagram of a 14 mm hybrid ion conducting film surrounded by a clear polymer collar.

The result was a 14 mm hybrid ion conducting film surrounded by an annular clear COP matrix polymer collar as shown in FIG. 12. This membrane may be sealed into a cell using O-rings compressed on the annular polymer only area, which was free of lithium ion conducting particles.

Examples 3-4

Ionic Conduction in a Hybrid Membrane

In some embodiments, the membranes in batteries and fuel-cells have high ionic conductivity, and little or no electronic conductivity. The standard method to distinguish between ion and electron conduction is to prepare a sample between chemically inert metallic electrodes such that no oxidation or reduction of the ionic species occurs. When a constant (dc) voltage is applied, these electrodes block the ionic current, but may allow the electron current, if any, to pass. On the other hand, both electrons and ions will respond to a time dependent voltage, for example sinusoidal time dependence (ac) or a voltage step (transient). The behavior as a function of ac frequency or time following the step is very different for electrons and for ions. Measurement of dc, ac and transient response therefore allows the separate characterization of ionic and electronic conduction.

Samples of the hybrid membrane were coated with 100 nm of gold on both sides. The diameter of the circular gold electrodes was typically 19 mm, giving an area of 2.8 cm². For reference purposes, a solid ceramic disk of the same ionic conductor as in the hybrid membrane was prepared and measured in the same way. The methods and results of several experiments are detailed in the examples that follow.

Example 3

A disk of hybrid ion conducting membrane including 90 micron $Li_{1.3}Al_{0.3}Ti_{1.7}(PO_4)_3$ (LATP) particles embedded in a COP matrix polymer was coated on both sides with 19 mm diameter gold electrodes, 100 nm thick. Using a Keithley source measure unit (SMU) a voltage of 0.1 V was applied at time t=0 and the current measured as a function of time thereafter. The initial current (actually t=0.8 s, limited by the response of the instrument) was 0.3 nA, and the current decayed to less than 1 pA, over a time of 300 s.

To obtain more accurate values of the initial current, a pulse generator and an oscilloscope were used. The current was measured by passing it through a series resistor of 1000 Ohms, and determining the resultant voltage across the resistor, in a series of progressively longer time-base sweeps. The instrumental time resolution was approximately 20 ns. The initial current in the hybrid membrane was determined to be at least 90 μA. The ratio of the initial current to the long-time current (90 μA/1 pA) places a lower limit on the ionic transference number of $T_{ion}$>0.99999999, or electron transference, $T_e$<$10^{-8}$. For comparison, a solid disk of the ceramic 0.5 mm thick, which is well known to be a lithium-ion conductor showed an initial current of 350 μA decaying to less than 1 nA after 900 s, thus for the ceramic $T_{ion}$>0.99999. It can therefore be concluded that the new hybrid membrane is an ionic conductor, with ion transference at least as high as the material of its ceramic component.

Figure 14:
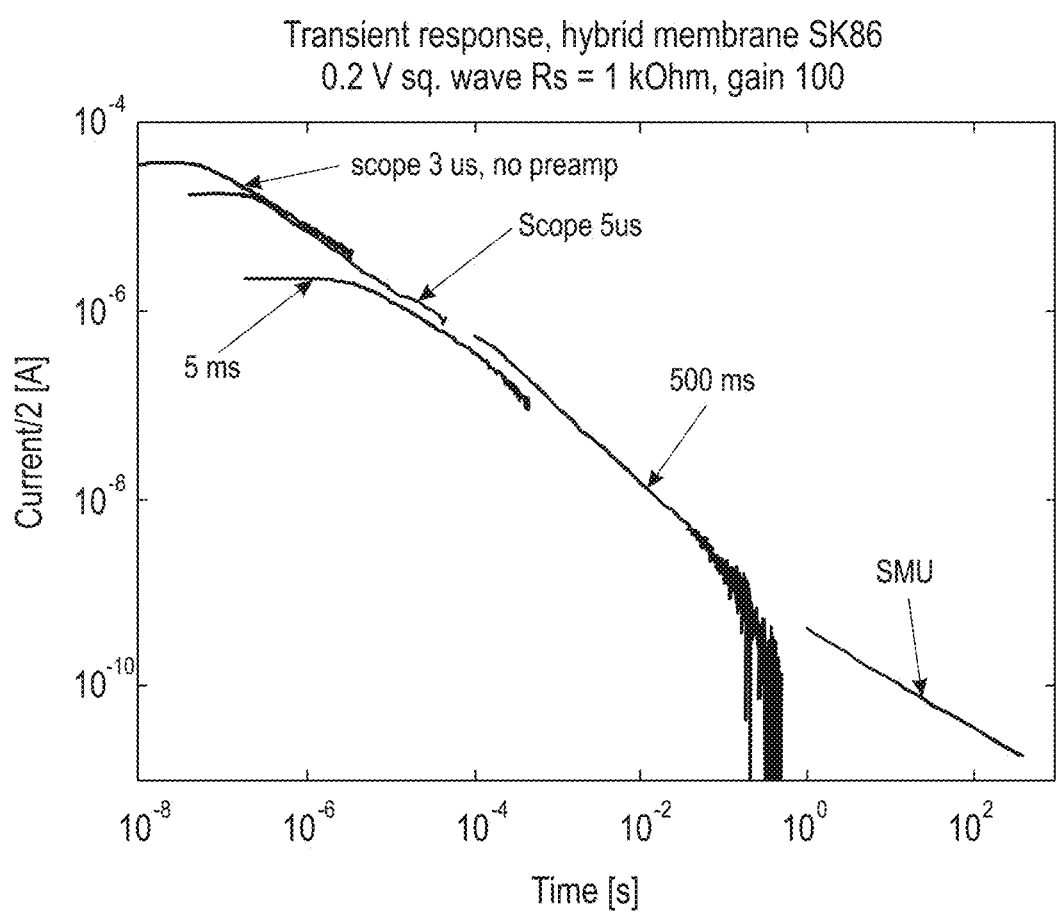
FIG. 14 is a plot of the time dependent decay of the current in the hybrid membrane of Example 3.

FIG. 14 shows the time dependent decay of the current in the hybrid membrane of this example following a step in voltage. For the oscilloscope traces the step is from −0.1 V to +0.1V, and the current is divided by two for comparison with the data from the source-measure unit (SMU), where the step is from 0 to +0.1 V. The results of this example show that the hybrid membrane of the current invention conducts lithium ions with an ionic transference and conductivity comparable to that of the ceramic component.

Example 4

An ion conducting membrane sample prepared in a similar manner to that of Example 3 above was connected between the terminals of an Agilent Model 4294A impedance analyzer. The frequency was scanned from 40 Hz to 110 MHz and the real and imaginary parts of the ac impedance were recorded, and plotted in a Nyquist diagram (FIG. 15, here showing only 1 MHz to 110 MHz).

The data reveal a capacitance voltage "lobe" corresponding to a resistance of approximately 160 ohms, with a characteristic frequency of $3 \times 10^7 s^{-1}$. This is comparable to the ionic resistance and dielectric relaxation rate of the parent ceramic material.

Figure 15:
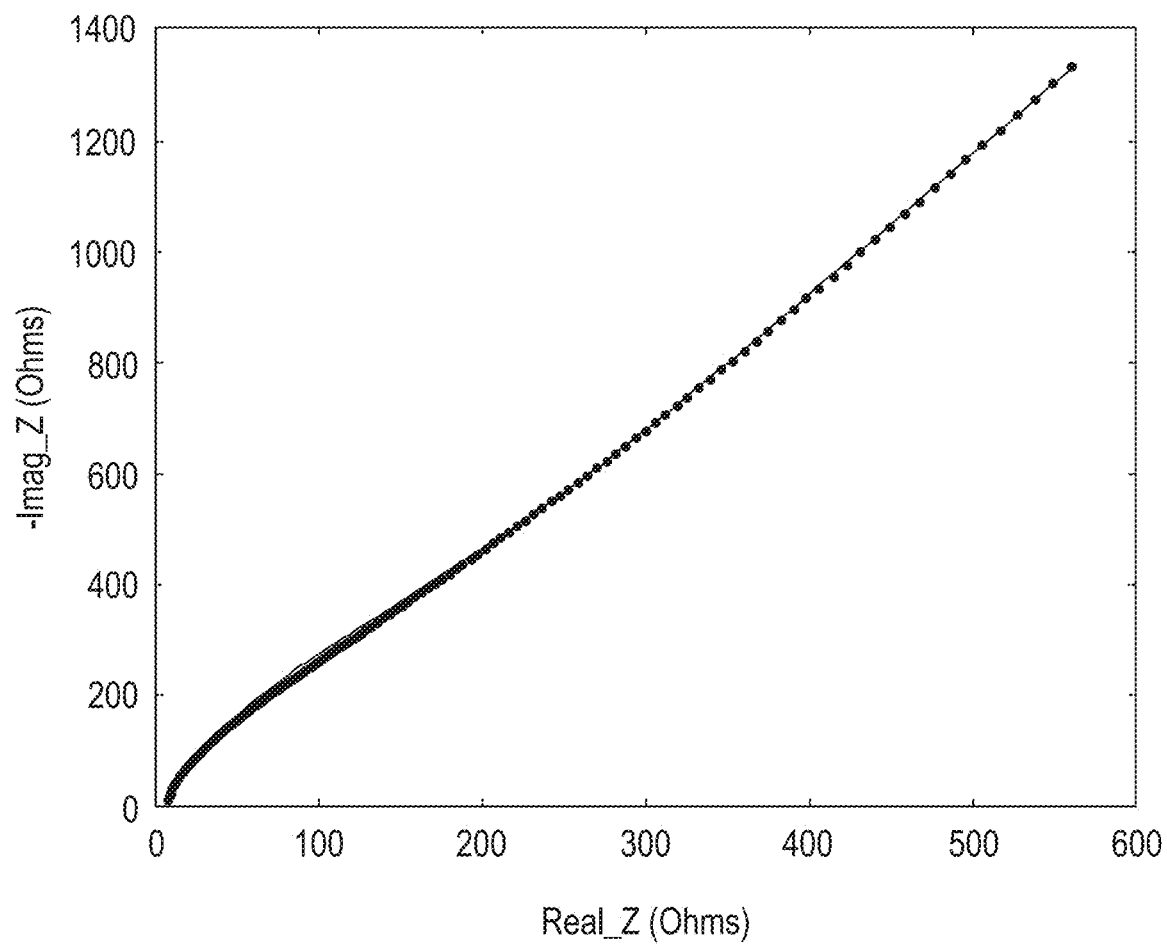
FIG. 15 is Nyquist plot of the ac impedance over a frequency range of 110 MHz to 1 MHz of a hybrid ion conducting membrane of Example 4.

FIG. 15 shows high impedance at low frequency, as expected for an ionic conductor with blocking electrodes. The partially resolved lobe centered at about 80 Ohms is due Li-ion conduction in parallel with the combined dielectric response of the ceramic and polymeric materials. The data in FIG. 15 also show that the dielectric relaxation rate of the hybrid membrane is similar to that of the ceramic parent material.

In view of the results of Examples 3-4, the processes used to fabricate the hybrid membrane described in the current invention retain the essential properties of ionic conduction and transference.

Various embodiments of the invention have been described. These and other embodiments are within the scope of the following claims.

The invention claimed is:

1. A device, comprising:
   a membrane comprising a polymer that is: (i) impermeable to oxygen, and (ii) insoluble in at least one polar solvent; and
   Li ion conducting particles in the membrane, wherein at least a portion of the particles have a first exposed surface projecting from a first side of the membrane and a second exposed surface projecting from an opposed second side of the membrane, wherein the exposed surfaces of the conducting particles are substantially free of the polymer, and wherein the thickness of the membrane is 15 μm to 100 μm.

2. The device of claim 1, wherein the thickness of the membrane is 15 μm to 65 μm.

3. The device of claim 1, wherein the thickness of the membrane is 15 μm to 30 μm.

4. The device of claim 1, wherein the membrane is impermeable to water and carbon dioxide.

5. The device of claim 1, wherein the polymer is chosen from cyclo-olefin polymers, poly-para-xylylenes, benzocyclobutenes, olefin addition polymers and copolymers, ring opening metathesis polymers and reduced forms thereof, acyclic diene metathesis polymers and reduced forms thereof, fluorocarbon addition polymers, fluoroether polymers, ring opened cyclobutyl fluoroethers, polyarylenes, polyarylene ethers, polybenzoazoles, polysiloxanes, silsequioxanes, polycarbosilanes, and mixtures and combinations thereof.

6. The device of claim 1, wherein the metal oxide lithium ion conducting particles comprise at least one of:
$Li_3La_{2/3-x}TiO_3$ or $Li_xLa_3M_2O_{12}$, wherein M=Zr, Nb, Ta, Sb, or Bi; or $Li_{2-2x}Zn_{1-x}Ge(OS)_4$ or $LiM_2(PO_4)_3$, wherein M=Ge, Ti, Hf, or Zr; and mixtures and combinations thereof.

7. A lithium oxygen battery, comprising:
an anode;
a porous cathode;
an electrolyte; and
a membrane between the anode and the cathode, wherein the membrane comprises a polymer matrix and Li ion conducting particles in the matrix, wherein a majority of the particles have a first exposed surface projecting from a first side of the membrane and a second exposed surface projecting from an opposed second side of the membrane, wherein the exposed surfaces of the conducting particles are substantially free of the polymer forming the polymer matrix, and wherein the thickness of the membrane is 15 μm to 100 μm.

8. The battery of claim 7, wherein the thickness of the membrane is 15 μm to 65 μm.

9. The battery of claim 7, wherein the thickness of the membrane is 15 μm to 30 μm.

10. The battery of claim 7, wherein the membrane is impermeable to water and carbon dioxide.

11. The battery of claim 7, wherein the polymer matrix is chosen from cyclo-olefin polymers, poly-para-xylylenes, benzocyclobutenes, olefin addition polymers and copolymers, ring opening metathesis polymers and reduced forms thereof, acyclic diene metathesis polymers and reduced forms thereof, fluorocarbon addition polymers, fluoroether polymers, ring opened cyclobutyl fluoroethers, polyarylenes, polyarylene ethers, polybenzoazoles, polysiloxanes, silsequioxanes, polycarbosilanes, and mixtures and combinations thereof.

12. The battery of claim 7, wherein the metal oxide lithium ion conducting particles comprise at least one of:
$Li_3La_{2/3-x}TiO_3$ or $Li_xLa_3M_2O_{12}$, wherein M=Zr, Nb, Ta, Sb, or Bi; or $Li_{2-2x}Zn_{1-x}Ge(OS)_4$ or $LiM_2(PO_4)_3$, wherein M=Ge, Ti, Hf, or Zr; and mixtures and combinations thereof.

13. The battery of claim 7, wherein the lithium ion conducting particles are embedded as a single layer in the polymer matrix.

14. The battery of claim 7, wherein the battery has a lithium ion conductivity greater than about $10^{-5}$ S/cm.

15. The battery of claim 7, wherein the electrolyte is aqueous.

16. The battery of claim 7, wherein the electrolyte comprises a polar solvent.

17. The battery of claim 7, wherein the battery comprises:
a first electrolyte on a first side of the membrane; and
a second electrolyte on a second side of the membrane, wherein the second electrolyte is different from the first electrolyte, and the second side of the membrane is opposite the first side of the membrane.

18. The battery of claim 7, wherein the porous cathode is chosen from carbon, metals, metal oxides, and mixtures and combinations thereof.

* * * * *